United States Patent [19]

Smith

[11] 3,734,516
[45] May 22, 1973

[54] CHUCK ASSEMBLY FOR TOOL HOLDERS

[76] Inventor: Theodore M. Smith, 14750 Puritan Avenue, Detroit, Mich. 48227

[22] Filed: June 14, 1971

[21] Appl. No.: 152,907

[52] U.S. Cl. .................................... 279/75, 279/1 B
[51] Int. Cl. ...................... B23b 31/04, B23b 31/22
[58] Field of Search ........................ 279/1 B, 22, 30, 279/75

[56] References Cited

UNITED STATES PATENTS

| 2,926,020 | 2/1960 | Dayton et al. | 279/75 |
| 2,736,561 | 2/1956 | Hansen | 279/75 |
| 3,398,965 | 8/1968 | Cox | 279/75 X |

Primary Examiner—Francis S. Husar
Attorney—Cullen, Settle, Sloman & Cantor

[57] ABSTRACT

A tool holder comprising a chuck locking sleeve, an adapter, and a bushing, wherein the adapter is locked to the sleeve against axial as well as rotatable displacement relatively by a ball grip means which serves not only for gripping the parts together against axial displacement but also for establishing a drive connection between the sleeve and the adapter.

3 Claims, 5 Drawing Figures

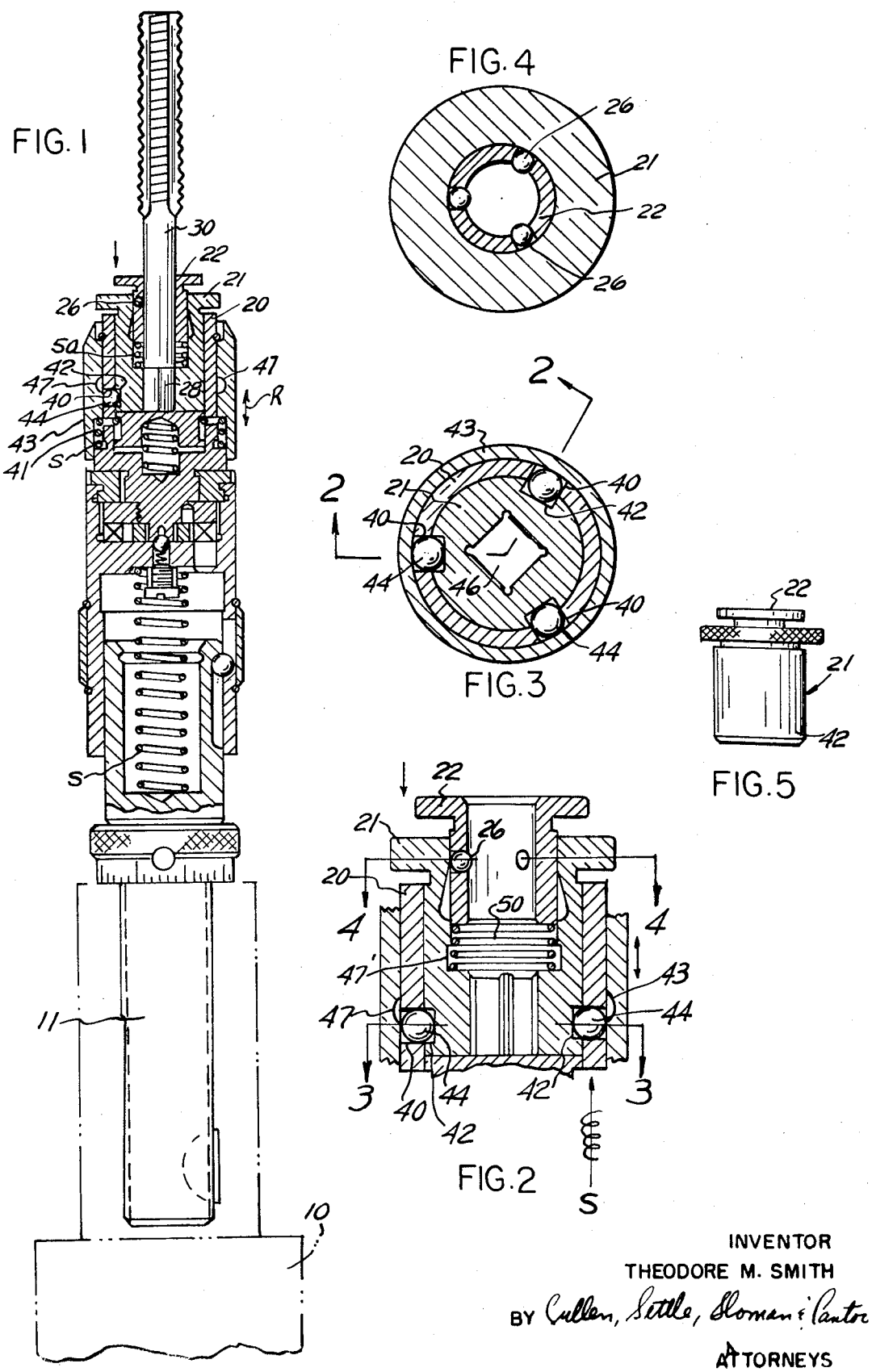

CHUCK ASSEMBLY FOR TOOL HOLDERS

BACKGROUND OF THE INVENTION

My prior U.S. Pat. No. 3,521,895 of July 28, 1970 shows a tool holder comprising an adapter and a bushing. The adapter is releasably coupled to a chuck sleeve by a ball grip means which includes a continuous groove around the periphery of the cylindrical adapter and such ball grip at such groove holds the adapter in the chuck sleeve against axial displacement in a conventional and well known manner.

The drive connection between the adapter and the chuck sleeve however is provided by two radial lugs on the periphery of the adapter at its upper end. These radial lugs shown at 18 in said patent seat in radial slots in the chuck sleeve and establish a drive connection between them.

In view of the considerable torques often developed in stopping and starting, sometimes cracking of the parts at these lugs and slots occurred because of the weakening of the parts at the slots.

In addition, because the adapter was equipped with these lugs integrally formed on the adapter, it was necessary to make the adapter of two parts, a body part having the lugs and an external stop ring as a separate part press fitted into place to form with the body part of the adapter a unitary construction.

OBJECTS

The present invention aims to eliminate the slots and lugs just described, thus eliminating the weakening of the chuck sleeve by the provision of slots, and eliminating the necessity for making the adapter in two parts to include the stopping ring.

The present invention attains its objective by providing a ball grip at the lower end of the adapter which releasably couples the adapter to the chuck sleeve and which is so formed that it also provides a drive coupling between the sleeve and the adapter.

THE DRAWING

The attached drawing shows a preferred embodiment of the tool holder incorporated within a tool of the compensating type such as disclosed in my prior U.S. Pat. No. 3,566,719 of Mar. 2, 1971.

In this drawing:

FIG. 1 is a longitudinal section view of a tool holder, with tool in place and with the tool holder shown as coupled to a drive spindle.

FIG. 2 is a fragmentary view of the upper end of the tool holder, per se directed primarily to the novel features of the present invention and is a view as if on line 2—2 of FIG. 3.

FIGS. 3 and 4 are section views as if on lines 3—3 and 4—4 of FIG. 2.

FIG. 5 is a small scale elevation view of the adapter per se.

DETAILED DESCRIPTION

FIG. 1 shows a drive spindle 10 receiving the shank 11 of a tool holder of the compensating type shown in U.S. Pat. No. 3,566,719. The upper end of the tool holder of FIG. 1 is formed with the novel features of the present invention and will now be described in detail with reference to FIGS. 2 to 5 particularly.

FIG. 2 shows a chuck locking sleeve or chuck sleeve 20, an adapter 21 therein, and a bushing 22 in the adapter, the bushing being formed with ball grip means 26 for gripping the tool 30, shown as a tap, for illustration, with its squared shank 28 drivingly nested within said adapter.

The present invention comprises a means for releasably coupling the adapter 21 to the cylindrical chuck sleeve 20 against axial displacement and also provides or establishes a torque drive connection between the adapter 21 and the chuck sleeve 20 which prevents relative rotation of the adapter and the sleeve.

FIGS. 2 to 4 particularly show the sleeve 20 as having in its interior wall, near its lower end, a circularly spaced series of ball receiving radial slots 40.

The drawing also shows the adapter 21 as having on its exterior surface near its lower end, a complementary series of peripherally spaced ball receiving sockets 42, each formed to receive part of a gripping ball 44. The sockets 42 are separate and spaced around the adapter 21. This is in sharp contrast to the continuous peripheral groove 20 of the tool holder of my prior U.S. Pat. No. 3,521,895. Likewise, the slots 40 are separate and are spaced around and extend through sleeve 20.

The lower end of the adapter 21 is formed with an axial non-circular squared tool shank receiving socket 46 in its lower part. The ball release shell 43 is normally spring biased forwardly as in FIG. 1 bearing against and retaining balls 44 in recesses 42. To release the adapter 21, shell 43 is manually retracted till its interior recess 47 registers with balls 44. Balls 44 move radially outward in sleeve slots 40.

The adapter 21 has its upper part counterbored at 47' to receive a compression spring 50 and above it the bushing 22. The releasable ball grip means already referenced at 26 couples the adapter 21 and the bushing 22 relatively for axial holding and release, when the tool 30 is in place.

The gripping balls 44 between the sleeve 20 and the adapter 21 provide not only a releasable grip between the sleeve and the adapter but also a driving connection between them.

Balls 26 provide the grip between the tool 30 and the bushing 22 and the adapter 21. Square shank 28 and square socket 46 provides a drive connection between the tool 30 and the adapter 21; balls 44 provide both grip and drive connection between the adapter 21 and the sleeve 20. Manual retraction of shell 43 releases balls 44 and adapter 21.

OPERATION

The bushing 22 may be pressed down manually into the adapter 21 and against the spring 50 for enabling the bushing 22 to receive the shank of a tool 30 which is projected all the way down into the lower end of the adapter and into the squared socket 46. Spring 50 provides a return and holding action.

A spring force from the tool holder itself as shown in FIG. 1 and indicated by the arrow S acts on the lower end of shell 43 which biases the balls 44 into the sockets 42 for gripping the adapter and the sleeve relatively for both of the previously mentioned purposes, axial gripping and drive. Release of the spring force indicated by the arrow S and movement of the shell downwards as indicated by the arrow R causes the recess 47 to release the balls 44 and thus release the adapter 21 from the sleeve and disestablish the driving connection and grip between them.

It will be observed that the adapter 21 is of one-piece construction and machining it to provide an external machined surface on it (FIG. 5) is a simple matter, not requiring the provision of a separately machined and separately provided stop ring as is required with previously known constructions employing radial lugs.

Essentially, the invention embraces a one-piece adapter 21 coupled to a sleeve 20 by a ball grip means 40-42-44-43 so formed that the balls seat in separate sockets 42 of the adapter and thus establish a drive connection between the sleeve and the adapter.

Now having described the tool holder herein disclosed, reference should be had to the claims which follow.

I claim:

1. Means for releasably coupling a tool receiving cylindrical adapter to a cylindrical chuck sleeve against axial displacement, and for establishing a drive connection between the adapter and chuck sleeve which prevents relative rotation of the adapter and sleeve; said means comprising said adapter, said sleeve, and a retractable ball holding shell on said sleeve;

said sleeve having a uniform cylindrical bore and through its interior wall, near its inner end, a series of circularly spaced ball receiving radial slots; and said adapter having on its exterior, a uniform cylindrical wall and near its inner end, a complementary series of peripherally spaced ball receiving sockets; there being gripping balls nested in said slots and extending into said sockets;

the gripping balls between the sleeve and the adapter providing not only a releasable grip between them against relative longitudinal adjustment, but also a torque driving connection between them;

and a forwardly biased cylindrical shell movably mounted on said sleeve normally retaining said balls in said sockets; and including an internal annular recess adapted to receive said balls when said shell is retracted;

said adapter having an axial non-circular tool shank receiving socket.

2. In the coupling means of claim 1, said adapter having its upper end part counterbored to receive a compression spring and above a bushing; with a releasable ball grip means between the adapter and the bushing and tool.

3. In a known tool holder of the type comprising a shell, a chuck sleeve having a uniform bore, an adapter having a cylindrical outer wall, and a bushing; with the shell normally biased forwardly by a spring but adapted to be retracted manually; and with the sleeve and adapter releasably interlocked by a ball grip means comprising circularly spaced balls seated in holes of the sleeve and manipulable by the shell for selectively lodging or dislodging the balls relative to a ball seating formation of the adapter for selectively locking or unlocking the adapter to permit or inhibit axial movement of the adapter relative to the sleeve; and with the adapter formed to receive a tool shank in a torque drive coupled relation; and with the bushing and adapter having a ball grip means for selectively locking or unlocking the tool shank against or for axial movement relative to the adapter; the improvement shown herein comprising said ball seating formation of the adapter being a series of separate independent ball receiving sockets spaced peripherally around the adapter, each receiving at least part of a ball, for establishing torque drive coupling between the adapter and the sleeve.

* * * * *

UNITED STATES PATENT OFFICE
CERTIFICATE OF CORRECTION

Patent No. 3,734,516          Dated May 22, 1973

Inventor(s) THEODORE M. SMITH

It is certified that error appears in the above-identified patent and that said Letters Patent are hereby corrected as shown below:

On the cover sheet, insert -- [73] Assignee

Lucille G. Smith and Theodore M. Smith, Trustees of the

Theodore M. Smith Trust, Detroit, Michigan --

Signed and sealed this 25th day of December 1973.

(SEAL)
Attest:

EDWARD M. FLETCHER, JR.          RENE D. TEGTMEYER
Attesting Officer                Acting Commissioner of Patents